(12) United States Patent
Warkentin et al.

(10) Patent No.: US 12,483,613 B2
(45) Date of Patent: Nov. 25, 2025

(54) SCALABLE DECENTRALIZED MEDIA DISTRIBUTION

(71) Applicant: PLEORA TECHNOLOGIES INC., Kanata (CA)

(72) Inventors: Chris Eric Warkentin, Ottawa (CA); Jonathan Chapman Hou, Stittsville (CA); Robert Turzo, Ottawa (CA); Thomas Madgett, Kanata (CA); James Daniel Falconer, Bavaria (DE); Yury Velikzhanin, Kanata (CA)

(73) Assignee: Pleora Technologies Inc., Kanata (CA)

( * ) Notice: Subject to any disclaimer, the term of this patent is extended or adjusted under 35 U.S.C. 154(b) by 302 days.

(21) Appl. No.: 17/925,207

(22) PCT Filed: May 14, 2021

(86) PCT No.: PCT/CA2021/050668
§ 371 (c)(1),
(2) Date: Nov. 14, 2022

(87) PCT Pub. No.: WO2021/226723
PCT Pub. Date: Nov. 18, 2021

(65) Prior Publication Data
US 2023/0231896 A1    Jul. 20, 2023

(30) Foreign Application Priority Data
May 15, 2020   (CA) .................... 3080972

(51) Int. Cl.
*H04L 65/70*    (2022.01)
*H04L 65/611*    (2022.01)
*H04L 65/75*    (2022.01)

(52) U.S. Cl.
CPC ............ *H04L 65/70* (2022.05); *H04L 65/611* (2022.05); *H04L 65/765* (2022.05)

(58) Field of Classification Search
CPC ....... H04L 65/70; H04L 65/765; H04L 65/611
(Continued)

(56) References Cited

U.S. PATENT DOCUMENTS

| 9,106,428 B2 * | 8/2015 | Matthews | H04L 49/201 |
| 2010/0295945 A1 * | 11/2010 | Plemons | H04N 23/51 |
| | | | 348/148 |

(Continued)

FOREIGN PATENT DOCUMENTS

WO    2010120707 A1    10/2010

OTHER PUBLICATIONS

Pleora Technologies, Local Situational Awareness Design and Military and Machine Vision Standards, Retrieved from https://www.pleora.com/resources/whitepapers/local-situational-awareness-design-and-military-and-machine-vision-standards/ (Year: 2017).*

(Continued)

*Primary Examiner* — Nicholas R Taylor
*Assistant Examiner* — Chong G Kim
(74) *Attorney, Agent, or Firm* — KDW Firm PLLC

(57) ABSTRACT

Described herein are various embodiments of decentralized media distribution systems, devices and methods over a scalable local network. Embodiments relate to scalable media distribution amongst media data components comprising at least one media acquisition unit for acquiring source media data, and at least one media presentation unit for processing source media data. Embodiments may comprise two or more transceiver units comprising: at least two source media signal ports for receiving source media signals and transmitting source media signals from and to one of the media presentation units; a signal converter operable to packetize source media signals for communication over said packetized communications network, and to convert packetized network media signals to source media signals for (Continued)

communicating to the media presentation units; and a packetized network media data transceiver operable to multicast and receive packetized network media signals over a packetized communications network to and from any other transceiver unit.

26 Claims, 10 Drawing Sheets

(58) Field of Classification Search
USPC .......................................................... 370/400
See application file for complete search history.

(56) References Cited

U.S. PATENT DOCUMENTS

| | | | | |
|---|---|---|---|---|
| 2011/0050925 | A1* | 3/2011 | Watanabe | H04N 23/66 |
| | | | | 348/E5.043 |
| 2011/0141221 | A1* | 6/2011 | Satterlee | H04L 12/1822 |
| | | | | 348/14.08 |
| 2016/0234263 | A1* | 8/2016 | Nakamura | H04L 67/14 |
| 2017/0310936 | A1* | 10/2017 | Nordin | G06F 3/1446 |

OTHER PUBLICATIONS

International Search Report corresponding to International Patent Application No. PCT/CA2021/050668 dated Aug. 26, 2021.
Written Opinion corresponding to International Patent Application No. PCT/CA2021/050668 dated Aug. 26, 2021.
RuggedCONNECT Smart Video Switcher and Plug-in AI for Local Situational Awareness, Rev 1.0, Pleora Technologies Inc., May 16, 2019 (May 16, 2019), Retrieved from <http://pleora.bentech-taiwan.com/RuggedCONNECT%20Smart%20Video%20Switcher.pdf>.
John Phillips—"Choosing the Right Video Interface for Military Vision Systems", Proceedings of SPIE, IEEE, US, vol. 9481, May 13, 2015, pp. 948111-1-948111-8.

* cited by examiner

| Attribute | Camera Link | CoaXPress | Ethernet |
|---|---|---|---|
| Native OS Support | No | No | Yes |
| Availability of Equipment | High | Low | High |
| Cable Type | Camera Link | Coaxial | Cat-5/6 or Fiber |
| Relative System Cost | High | Medium | Low |
| Max Throughput (single cable) | 2.1 Gb/s | 6.25 Gb/s | 10 Gb/s |
| Max Distance (@max throughput) | 10 m | 120 m @ 1.25 Gb/s<br>40 m @ 6.25 Gb/s | 100 m (copper)<br>40 km (optical) |
| Network Topology (without specialized equipment) | Point-to-point | Point-to-point | Mesh |
| Interface to available PC ports | No | No | Yes |
| Vision System Deployments | Wide | Initial field trials (small number of vendors) | Wide |
| Benefits from extra-industry adoption | Low | Low | High |
| Standard Maturity | High | Low | High |

Figure 1

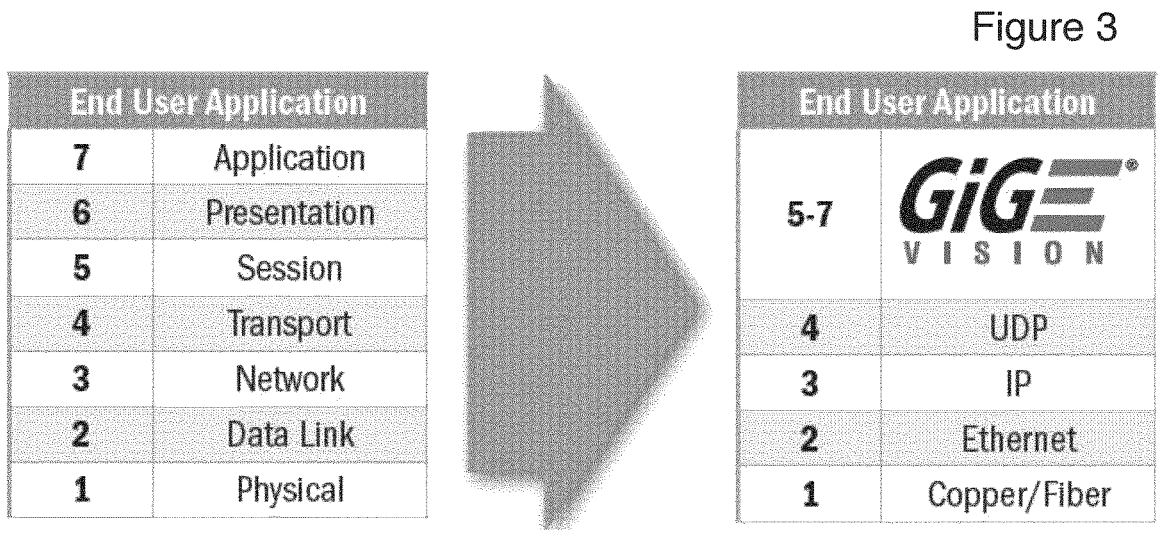
Figure 2
Figure 3
Figure 4

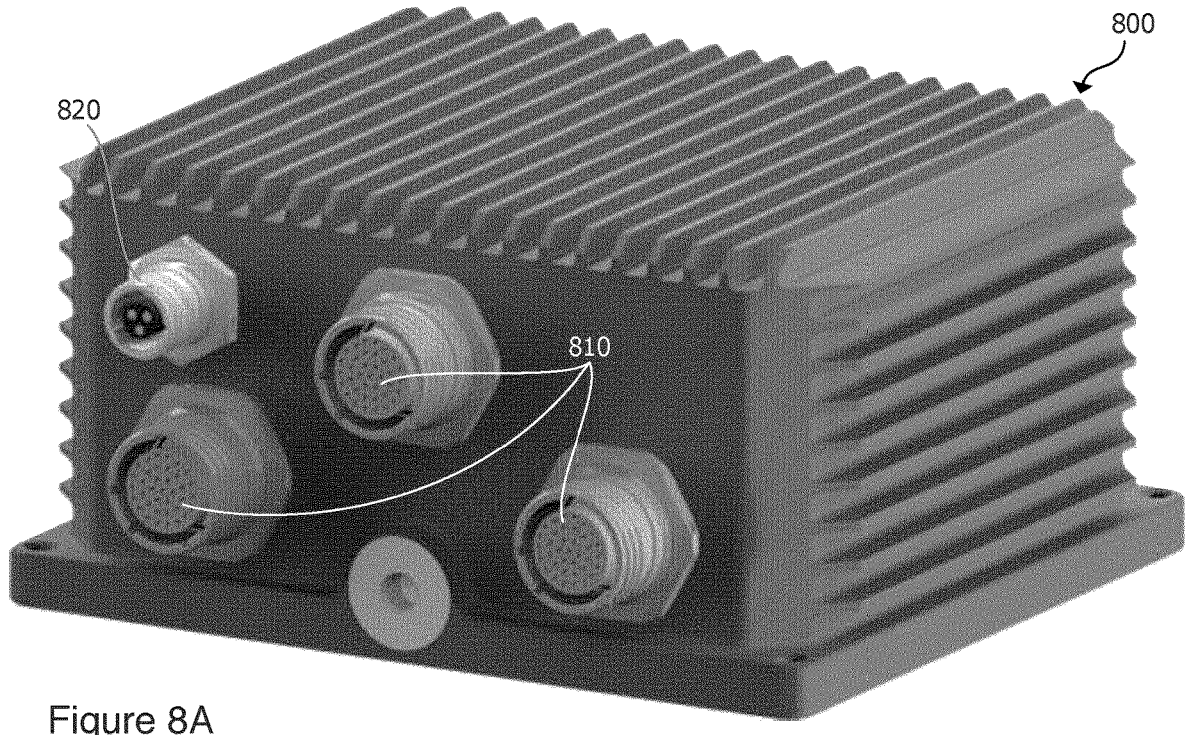

Figure 8A

| Functional Specifications | |
|---|---|
| Video Input | 8 channels of RS-170/NTSC/PAL |
| Network I/F | • 2 channels of 1 Gbps Ethernet<br>• 8 channels or RS-170/NTSC/PAL or 2 channels of HD-SDI |
| Video Streaming Protocol | GigE Vision 2.0 and Def Stan 00-082 |
| Communications | • 1 x channel CANbus<br>• 1 x channel USB2.0 |
| Compression | HW codec for multi-channel H.264/H.265/JPEG2000 |
| Display Interfaces | 2 fully independent channels of HD-SDI |
| Customization Options: | |
| Video inputs | VGA/HDMI/DVI |
| Video outputs | VGA/DVI/HDMI |
| Communications | RS232/422/485 |

| Mechanical, Environmental, Power | |
|---|---|
| Conformal Coating | Applied to all PCBs |
| Power Connector | MIL-DTL-38999 Series III |
| Sensor I/O Connector | MIL-DTL-38999 Series III |
| Ethernet Connector | MIL-DTL-38999 Series III |
| Enclosure | Aluminum Alloy |
| Shock and Vibration | MIL-STD-810G |
| EMI | MIL-STD-461F |
| Power Supply | MIL-STD-1275E |
| Power Consumption | <50W |

Figure 8B

Figure 10A
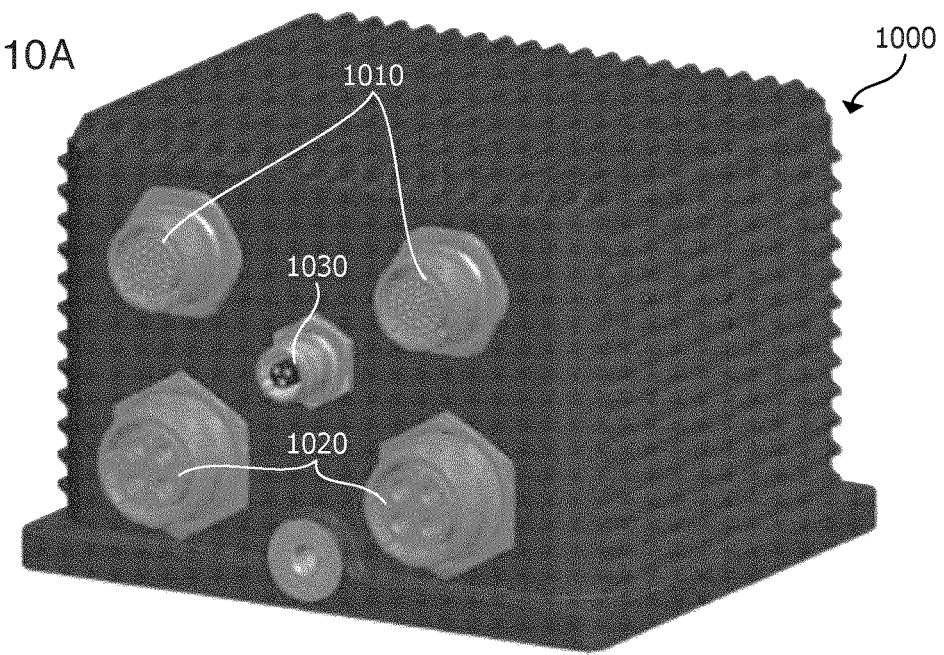
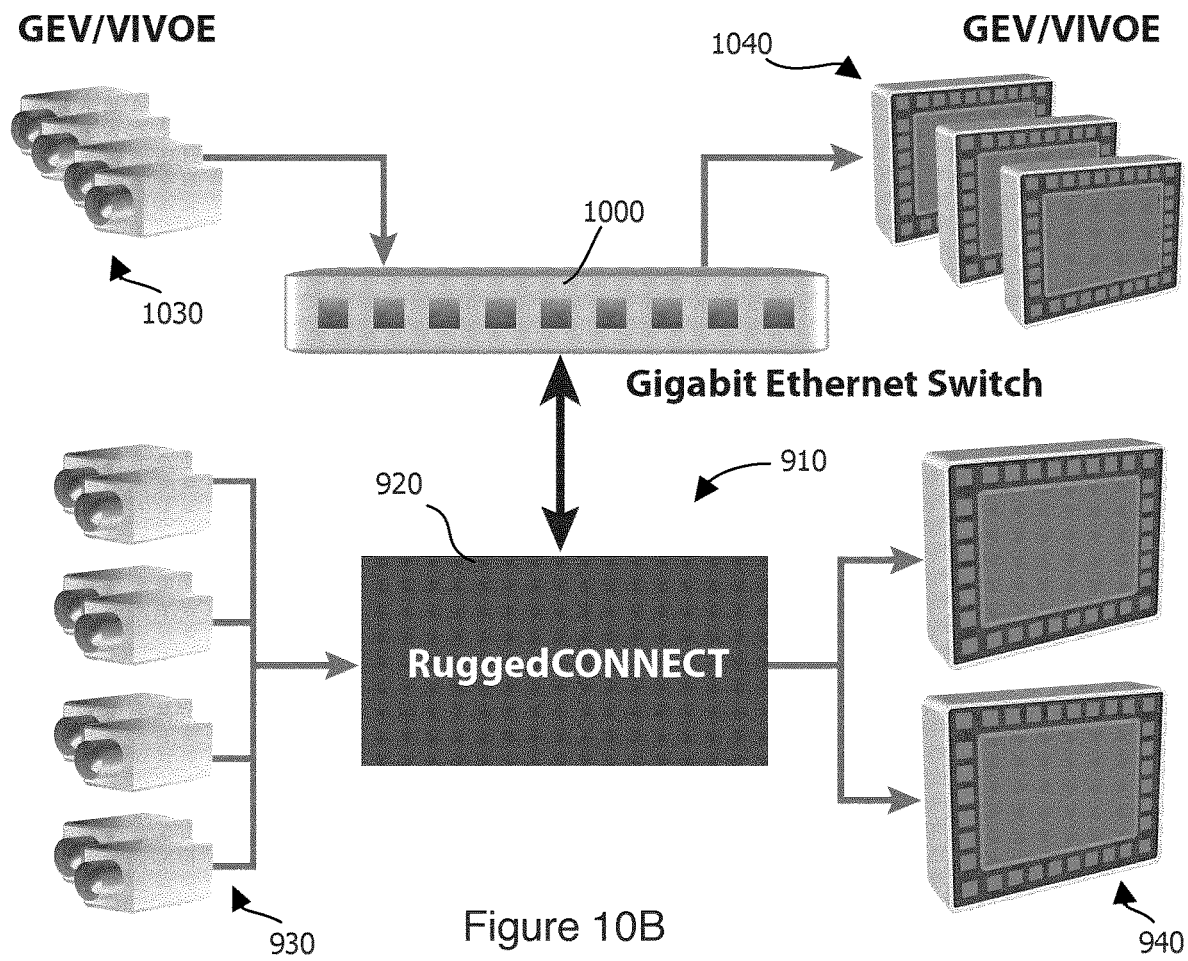
Figure 10B

SCALABLE DECENTRALIZED MEDIA DISTRIBUTION

FIELD OF THE DISCLOSURE

The present disclosure relates to media communications, and, in particular, to decentralized media distribution systems, methods, and devices.

BACKGROUND

Traditional military imaging systems employ point-to-point interfaces to connect sensors, processors, and displays. This approach typically adds system and integration costs, redundancy and failure concerns, and challenges scalability. Moreover, this may result in complex systems and vehicle electronics that an already overburdened crew may have difficulty operating.

System scalability may be improved by incorporating wireless devices. For instance, United States Patent Application number 2017/0310936 A1 entitled "Situation awareness system and method for situation awareness in a combat vehicle" and published Oct. 26, 2017 to Nordin discloses a system for transmitting images of a surrounding environment to a plurality of display devices upon request thereof via a network switch or other centralized component. However, such systems do not address the needs of decentralized scalability requirements associated with wired camera-to-display systems and networked architectures integrating different sensor and display types, including switching, processing, and recording units.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a decentralized scalable media distribution system that overcomes some of the drawbacks of known techniques, or at least, provides a useful alternative thereto. Some aspects of this disclosure provide examples of such a system.

In accordance with one aspect, there is provided a scalable media distribution system operable to interface with a plurality of media data components, said media data components comprising at least one media acquisition unit that acquires source media data and outputs corresponding source media signals, and at least one media presentation unit that receives source media signals and processes corresponding source media data, the system comprising two or more transceiver units, each transceiver unit comprising: at least two source media signal ports, said media signal ports configured to provide a connection to the media components, at least one of said media signal ports for receiving source media signals from one of the media acquisition units and at least one of said media signal ports for transmitting source media signals to one of the media presentation units; a signal converter operable to packetize source media signals received via said source media signal ports from one of the at least one media acquisition units for communication over said packetized communications network, and to convert packetized network media signals to source media signals for communicating to one of the at least one media presentation units via one of said source media signal ports; and a packetized network media data transceiver operable to wirelessly, or via a wired connection, send and receive packetized network media signals over a packetized communications network; wherein each of said transceiver units are operable to multicast packetized network media signals over said packetized communications network (which may be wireless or wired) and to receive packetized network media signals multicasted over said packetized communications network by any other transceiver unit.

In accordance with another aspect, there is provided a transceiver unit device for providing scalable media distribution, the transceiver unit device configured to interface with a plurality of media data components, said media data components comprising at least one at least one media acquisition unit for acquiring source media data and providing to said transceiver unit source media signals corresponding to said source media data, and at least one media presentation unit that receives source media signals from said transceiver unit and processes corresponding source media data, the transceiver unit device comprising: at least two source media signal ports, said source media signal ports configured to provide a connection to the media components, at least one of said media signal ports for receiving source media signals from one of the media acquisition units and at least one of said media signal ports for transmitting source media signals to one of the media presentation units; a packetized network media data transceiver operable to wirelessly, or via a wired connection, multicast packetized network media signals over said packetized communications network to additional transceiver units and to receive packetized network media signals multicasted over said packetized communications network (which may be multicasted wirelessly, or wired connections, or both) by any other transceiver unit; and a signal converter operable to packetize source media signals received via said source media signal ports from one of the at least one media acquisition units for communication over said packetized communications network, and convert packetized network media signals to source media signals for communicating to one of the at least one media presentation units via said source media signal ports.

In accordance with another aspect, there is provided a scalable media distribution method for interfacing a plurality of media data components, said media data components comprising at least one media acquisition unit that acquires source media data and outputs corresponding source media signals, and at least one media presentation unit that receives source media signals and processes corresponding source media data, the method comprising: receiving as input at one of a plurality of source media signal ports disposed on a first transceiver unit the source media signal, at least some of said source media signal ports configured to provide a connection between the at least one media acquisition unit and said first transceiver unit for receiving source media signals; converting the source media signal received by the first transceiver unit to packetized network media signals; multicasting said packetized network media signals over a packetized communications network (which may be multicasted wirelessly, or wired connections, or both); receiving from any one or more additional transceiver units packetized network media signals; converting packetized network media signals to the source media signal; and outputting via one of the source media signal ports the source media signal, said output source media port configured to provide a connection to at least one of the one media presentation units.

In accordance with another embodiment, there is also provided a scalable media distribution system operable to interface with a plurality of media data components, said media data components comprising at least one media acquisition unit that acquires source media data and outputs corresponding source media signals, and at least one media presentation unit that receives source media signals and processes corresponding source media data, the system comprising: two or more transceiver units, each transceiver unit in turn comprising: at least two source media signal ports, said media signal ports configured to provide a connection to the media components, at least one of said media signal ports for receiving source media signals from one of the media acquisition units and at least one of said media signal ports for transmitting source media signals to one of the media presentation units; a signal converter operable to packetize source media signals received via said source media signal ports from one of the at least one media acquisition units for communication over said packetized communications network, and to convert packetized network media signals to source media signals for communicating to one of the at least one media presentation units via one of said source media signal ports; and a packetized network media data transceiver operable to wirelessly, or via a wired connection, send and receive packetized network media signals over a packetized communications network; wherein each of said transceiver units are operable to transfer packetized network media signals over said packetized communications network in accordance with a routing scheme and to receive packetized network media signals transferred over said packetized communications network by any transceiver unit in accordance with said routing scheme. The routing scheme of such embodiments may be selected from any one of the following: unicast, multicast, broadcast, anycast, and geocast. Such routing scheme may be wireless, via wired connections, or both. In some embodiments, transceiver units can be configured to selectively transfer or receive packetized network media signals to a subset of other transceiver units, wherein the selectivity of the subset of transceivers is based on characteristics relating to one or more of the following: the media data components, the source media signal, one or more of said source media signal ports, the source media data, the source media signals, and the transceiver unit.

Embodiments hereof provide for scaling a virtually unlimited number of connective inputs and outputs for media acquisition and presentation units in a decentralized manner. Architectures associated with embodiments hereof leverage Ethernet, or other network data communications technologies and standards (including others that can be classified as provisioning communications up to the "link" or "data link" layers in, respectively, the Internet Protocol suite or the OSI model), as a bus to scale video or other sensory data, and have access to video on any device/transceiver connected to the decentralized network. In embodiments, inputs of any one device can be accessed via the outputs of any other device, without the requirement to access a centralized or remote network server or network of servers. In some embodiments, a sensor/Ethernet interfacing protocol is implemented to facilitate that connection of the sensor device to a transceiver on a network, and the transceiver communicates to all the other transceivers the interfaced sensor information, and the receiving transceivers convert that information back, using the same interfacing protocol. In embodiments described herein, GigE Vision is used as an interfacing protocol, but the disclosure hereof is not intended to be limited to that interfacing protocol (or indeed to Ethernet as the network communication technology).

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 1 is a table of various attributes of digital video connectivity technologies;

FIG. 2 is a table of a hierarchical Open System Interconnection (OSI) Reference Model for communications and computer networking;

FIG. 3 is a schematic of GigE Vision operations in the OSI model shown in FIG. 2, in accordance with various embodiments;

FIG. 4 is a schematic of Version 2.0 of the GigE Vision standard focused on five high-speed transport technologies, in accordance with various embodiments;

FIG. 8A is an image of an exemplary network processing unit;

FIG. 8B is a table of exemplary specifications related to the unit of FIG. 8A, in accordance with various embodiments;

FIG. 10A is an image of an exemplary network switch;

FIG. 10B is a schematic of an exemplary network comprising the system of FIG. 9A and a system comprising the switch of FIG. 10A, in accordance with at least one embodiment;

Figure 5:
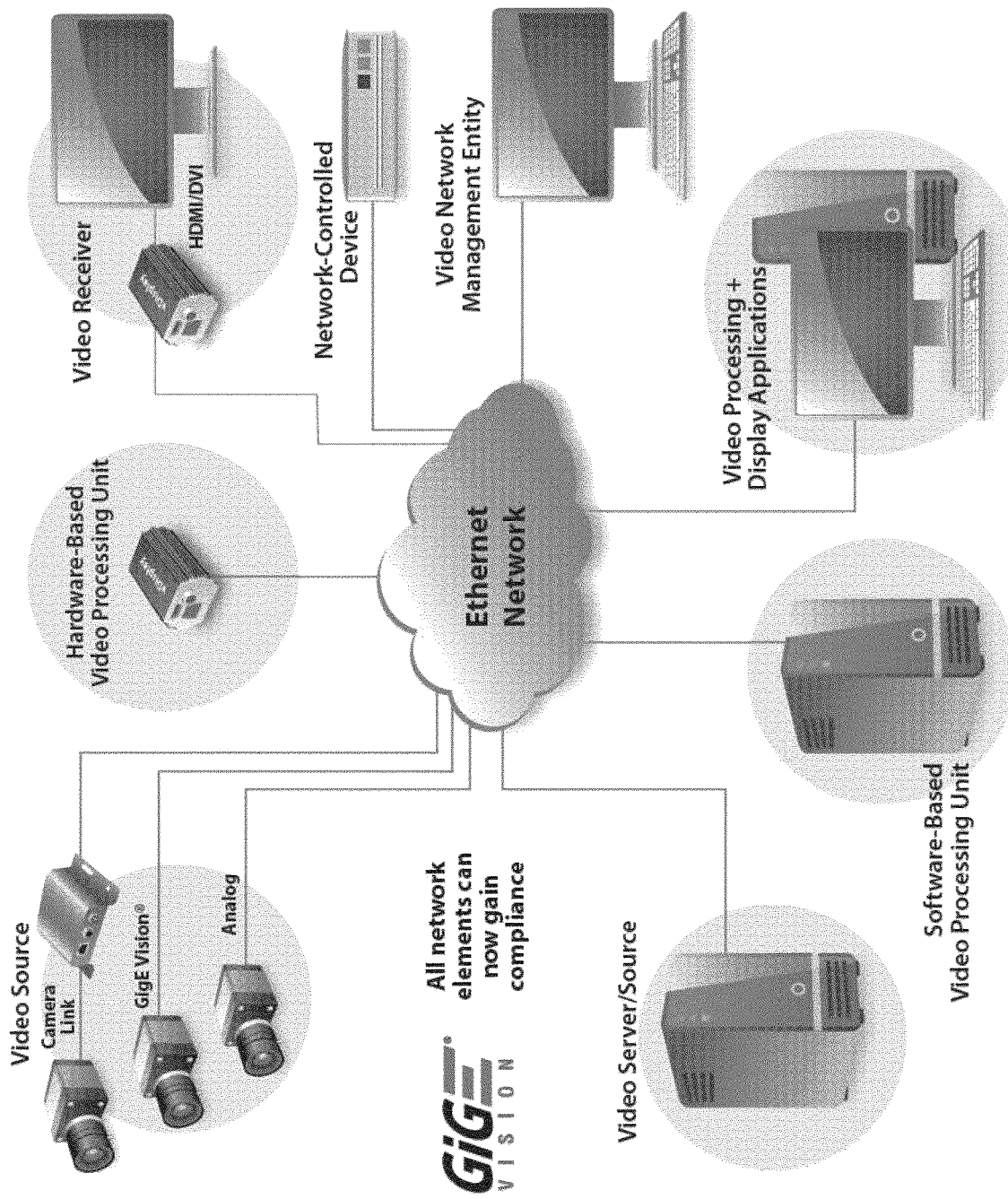
FIG. 5 is a schematic of a GigE Vision framework encompassing a wide range of network elements, in accordance with various embodiments.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

The systems and methods described herein provide, in accordance with different embodiments, different examples of a ruggedised networking platform for sensor-to-presentation systems. Various embodiments relate to video and/or audio communication networks in armored vehicles, tanks, and the like, and may be of use in, for instance, reducing cognitive burden and increasing mission-effectiveness for end-users while meeting interoperability and scalability demands in size, weight, power and cost in sensitive real-time military applications.

Embodiments hereof provide for scaling a virtually unlimited number of connective inputs and outputs for media acquisition and presentation units in a decentralized manner. Architectures associated with embodiments hereof leverage Ethernet, or other network data communications technologies and standards (including others that can be classified as provisioning communications up to the "link" or "data link" layers in, respectively, the Internet Protocol suite or the OSI model), as a bus to scale video or other sensory data, and have access to video on any device/transceiver connected to the decentralized network.

In one embodiment of a system disclosed hereby, the system can be characterized as one or more transceivers that are configured to interface media components, the media components comprising one or more media acquisition units with one or more media presentation units. Such media acquisition units automatically acquire extraneous information, and may include one or more of the following non-limiting examples: cameras, sensors, frame grabbers, or other imaging, vision, or sensing input devices. Such media presentation units, sometimes referred to as media processing units, automatically process the extraneous information acquired by the media acquisition units, and may comprise one or more of the following non-limiting examples: displays and monitors, image and vision analysis devices, and network communication devices (e.g. for display at a remote location for guiding/piloting an unmanned vehicle). In embodiments, the inputs of any one transceiver units can be accessed via the outputs of some or all of the other transceiver units, without the requirement to access a centralized or remote network server or network of servers, or indeed accessing any other network device other than the transceivers themselves. While in some embodiments, the media presentation unit (or media processing unit) presents or displays media data (e.g. a visual display or monitor), other media data processing is possible. For example, automated machine vision processing; automated analysis for distinguishing specific shapes, colours, heat, material (e.g. organic vs. inorganic material); further communication; detecting movement; detecting non-conforming material; and other processing.

In some embodiments, an interfacing protocol is implemented in association with the connection of the media component to a given transceiver device, so that the signal received from the medial component can be communicated over a network (e.g. the Internet, or a local or personal area network) using standard communications technologies and protocols (e.g. Ethernet). The transceiver communicates the signal, as a network-enabled communication generated in accordance with the interfacing protocol, to all the other transceiver devices the interfaced sensor information, in some cases by multicasting to the other transceiver devices (wirelessly, via wired connections, or both), and the receiving transceiver devices convert that information back to a media signal, using the same interfacing protocol. In embodiments described herein, GigE Vision is used as an interfacing protocol, but the disclosure hereof is not intended to be limited to that interfacing protocol (or indeed to Ethernet as the network communication technology).

In some cases, there is a direct transmission of the media signal from a receiving signal port to a transmitting signal port on the same transceiver device, either with our without conversion to and from the network-enabled communication. Such embodiments may be implemented to reduce signal latency.

Traditional military imaging systems may employ point-to-point interfaces to connect sensors, processors and displays, which may add system and integration costs, redundancy and failure concerns, and may challenge future scalability. In many in situ installations, including but not limited to vehicular installations, the physical space limitations for adding additional wiring, as well as hardware that may be required for interfacing different cabling inputs/outputs and/or communication formats is highly limited. Accordingly, scaling existing in situ installations, as may be required when adding new video (or other sensor) acquisition devices, video (or other types of) display or presentation devices, and/or video (or other senor) communications devices, can be challenging. Moreover, such platforms may result in complex vehicle electronics systems that are difficult to operate for an already overburdened crew. Various embodiments herein disclosed, on the other hand, relate to a platform that may convert sensor data from multiple sources into a standardized feed that may be transmitted over a network to endpoints, such as visual displays, audio headsets, and the like.

In accordance with various embodiments, a network platform may comprise low latency, multicast Gigabit Ethernet (GigE), and may be a modular, scalable platform for the straightforward design, manufacture, and implementation of, for instance, camera-to-display systems. Furthermore, such a platform may be cost-effectively evolved to fully networked architectures integrating different sensor and display types, switching, processing, and recording units, and may meet various performance requirements for various applications. In accordance with various embodiments, through migration to a unified sensor and display network, hardware and peripheral equipment may be reduced within, for instance, a vehicle, and simplified, less expensive cabling may be deployed to help meet various cost and/or weight objectives. Furthermore, with devices having the ability to connect to a common infrastructure, irrespective of the output or input requirements for an existing device, sensor data may be transmitted to, for instance, any combination of mission computers and displays. As such, vehicle crew may view required information on a single display to know immediately if something has changed in an environment. Furthermore, embodiments comprising a dual ethernet port and passive bypass design enable reliable performance and protection against single-point-of-failure risks.

While numerous exemplary embodiments described herein relate to use contexts relating to vehicles, subject matter disclosed herein may be incorporated with or used in association with many different use contexts. For example, systems, methods, and devices disclosed herein may be implemented in new or existing machine vision systems. In such systems or similar systems, vision, auditory, sensory, or other environmental data may be obtained by a source device and transmitted via transmitters to a media presentation device for automated analysis by a machine, which may not involve any display (or other broadcasting or presentation) of the collected vision, auditory, sensory, or other environmental data. The received data may be analysed by a machine (i.e. a computer or computing device) without re-creating the collected information as, for example, in a display screen or a speaker. The data may be analyzed in a machine-analysis system, such as a machine vision or machine-based sensory system. In some relevant examples, this could include factory- or manufacturing-based automated systems, autonomous cars and vehicles, other autonomous systems, medical devices and surgery devices using cameras or other sensory devices, machine-based investigation/diagnostic information systems for human/animal and non-human/non-animal systems (e.g. investigating inaccessible features in a plumbing, electrical, or geological system). In some cases, the presentation unit may not in fact "present" acquired data in a manner that is consumable by a human; in fact, a machine-based or automated analysis system may constitute the presentation unit as it is presented with the underlying digital data that represents that acquired signals.

Various embodiments may further relate to low-latency networks with user-focused design to help increase intelligence, awareness, and safety while reducing cognitive burden for vehicle crew members through standards-compliant vehicle platforms (e.g. Def Stan 00-082 (VIVOE), STANAG 4697 (PLEVID), MISB ST 1608, STANAG 4754 (NGVA), Def Stan 23-009 (GVA), VICTORY guidelines, and the like) that are rapidly deployable, mission configurable, and cost-effective. Various platforms may further be highly scalable, allowing ready implementation of future capabilities that may increase mission effectiveness with minimum integration effort. Furthermore, various embodiments may comprise high-performance video networking capabilities that may be combined with powerful GPU resources (e.g. NVIDIA Jetson TX2i), application-specific image processing, graphics overlay, and/or decision-support capabilities to reduce cognitive burden and increase mission effectiveness. For instance, various embodiments may further comprise image fusion capabilities, 360-degree view stitching, map/terrain overlay, image enhancement, convolutional-neural-network based threat detection and classification, and the like.

An opportunity to increase the safety and tactical advantage of troops in combat operations lies in incorporating advanced digital vision sensors into the local situation awareness (LSA) systems of land-based vehicles. These sensors offer several times the capability of previous generations, making it possible to positively identify an object or person miles away, even at night.

Moreover, unlike the outputs of analog sensors, the all-digital image streams generated by advanced sensors can be fed directly into sophisticated in-vehicle digital processing applications, improving the precision of tasks such as surveillance and targeting.

New-generation vision sensors create a substantial opportunity, but also pose a significant challenge. Behind the crisp, high-definition images they produce are millions of pixels of high-speed digital data. To fully leverage the potential of this data in LSA systems, it must be distributed, displayed, and processed in real time with ultra-high reliability.

Today's in-vehicle systems typically consist of different types of analog and digital cameras and image sensors mounted on the vehicle. They generate a range of video formats operating at a variety of data rates. Mixers are sometimes used to combine analog signals for multi-image viewing by crew members on a single mission computer or smart display inside. More typically, video is streamed directly to the computer or display.

These point-to-point connections where many cameras are involved, the cabling becomes costly, complex, difficult to manage, and expensive to scale. To overcome these limitations an improvement that can be made to LSA systems is to deploy a networked connectivity system that handles the throughput of advanced cameras and sensors and brings together into a common topology both new equipment and legacy gear, such as analog cameras, which may in some embodiments be very difficult to replace due to cost, integration with other systems, familiarity, or other practical concerns. In other words, a network framework is required that provides a seamless path from the past to the future.

By having all devices connected to a network and speaking the same language, multiple streams of video from different cameras can be transmitted easily to any combination of mission computers and displays, significantly improving LSA. The video feed from an infra-red sensor, for example, could be mapped against the image from a day sensor to give crew members more detail on a region of interest than could be provided by either on its own. Networked topologies also eliminate cabling and scale easily to accommodate increasing bandwidth needs and the addition of new cameras, processing nodes, and viewing stations.

A modern in-vehicle video connectivity system must also offer robust, reliable transport that can deliver "glass-to-glass" video in real-time with virtually no delay between what the camera sees and what is displayed on monitors inside the vehicle. Furthermore, modern in-vehicle video connectivity systems must be based on standards of interoperability and cost-effectiveness.

FIG. 1 compares key attributes of the digital video connectivity candidates of Camera Link®, CoaXPress, and Ethernet that systems manufacturers and integrators may consider for use in vehicular LSA applications. Camera Link® is a digital serial interface standard introduced in 2000 by the Automated Imaging Association (AIA). It transports imaging data at high rates (up to ~6.8 Gb/s) over direct links of ~10 m or less. Cable extenders can be used to lengthen the short reach of Camera Link connections, but at significant cost. Camera Link is also limited by its dependence on point-to-point topologies. Cameras are essentially tethered to the frame grabbers in PCs, restricting system design options. Many vendors offer frame grabbers that support more than one camera, but the resultant 'star' deployments do not offer the flexibility and scalability of a true networked topology.

CoaXPress, is a standard for a point-to-point, asymmetrical serial communication that runs over coaxial cable. It was introduced in 2009 by a small industry consortium and was approved by the Japan Industrial Imaging Association (JIIA) in December 2010. It offers longer reach than Camera Link (~40 m at ~6.25 Gb/s, or ~120 m at ~1.25 Gb/s) but is supported by only a small group of vendors and is not widely deployed. Furthermore, the two chips needed to support its implementation are available today from only one vendor, and, like Camera Link, CoaXPress does not support networked video.

Ethernet, on the other hand, is a time-honored standard that is deployed in most of the world's local area networks, including those for high-performance, real-time military and industrial applications. It is supported by a low-cost, well-understood, and widely available infrastructure. It delivers exceptional networking flexibility, supporting almost every conceivable connectivity configuration, including point-to-point, point-to-multipoint, multi-point to multi-point, and multi-channel aggregation.

Ethernet delivers high bandwidth. GigE (Gigabit Ethernet), the widely available third generation of the standard, delivers ~1 Gb/s, and the fourth generation, 10 GigE, now ramping quickly in mainstream markets, delivers ~10 Gb/s. All Ethernet generations use the same frame format, ensuring backward compatibility and permitting system upgrades without sacrificing the equipment already in place. It also offers long reach, allowing spans of up to ~100 meters between network nodes over standard, low-cost Cat 5/6 copper cabling, and greater distances with switches or cost-effective fiber extenders. With now-inexpensive fiber cabling, distances of up to ~40 km can be achieved without intervening equipment.

Ethernet is scalable, supporting meshed network configurations that easily accommodate different data rates and the addition of new processing nodes, displays, and sensors. Ethernet ports are built in to every laptop and ruggedised notebooks, as well as nearly all single-board computers (SBCs) and embedded processing boards, eliminating the need for an available adapter card slot in a PC to house a traditional frame grabber. As it delivers a unique combination of networking, throughput, flexibility, distance, and scalability, it an optimal choice for the COTS (commercial off-the-shelf) platform of digital video connectivity systems for military vehicles.

FIG. 2 shows a hierarchical seven-layer Open System Interconnection (OSI) Reference Model for communications and computer networking. In accordance with various embodiments, Ethernet operates at level 2 (data link), and standardises the routing of data based on destination information in each data packet known as a Media Access Control (MAC) address. Every element in an Ethernet network, such as switches and NICs (network interface cards/chips), has a unique MAC address. Other networking functions, such as formatting data into IP packets, overseeing data transport and flow control, managing sessions, and formatting information for the user application, are handled by higher level protocols in the OSI model. With few exceptions, Ethernet networks use IP at Layer 3. At Layer 4, the most familiar protocol, and the one used in most local area networks (LANs) is Transmission Control Protocol (TCP). TCP has a heavy protocol overhead and is optimized for accurate rather than timely data delivery. It guarantees delivery, but latency measured in seconds is common while the protocol waits for out-of-order messages, retransmissions of lost messages, or most commonly, simply waiting for synchronization of packet acknowledgements.

TCP is thus not recommended for mission-critical vehicle electronics (vetronics) applications for LSA, which depend on the immediate delivery of video data with low, predictable latency. For applications in this class, a better choice at layer 4 may be User Datagram Protocol (UDP), which is simpler than TCP, with lower protocol overhead. It is better suited for low-latency networked video, with the caveat that it does not guarantee data delivery.

UDP is a better starting point than TCP. However, the reliability, efficiency, and effectiveness of systems that transfer video over Ethernet are still determined primarily by two factors: the protocols used at layers 5 to 7, and the sophistication and quality of the video connectivity solution implemented at these layers.

Today, the most mature and proven set of protocols at OSI Layers 5-7 for the delivery of video and control data over Ethernet networks is embodied in the GigE Vision standard, which is open and globally accepted. Since its introduction by the AIA in 2006, it has been adopted by over 100 leading hardware and software companies that develop and sell equipment for high-performance video applications. The interoperation of these products has been demonstrated at an ongoing series of international plug fests and maintained by conformance testing. The value of the standard for high-performance, real-time video applications has been proven in the design of thousands of unique products for the military, aerospace, medical, and manufacturing sectors.

FIG. 3 illustrates how the GigE Vision standard fits into the OSI model. Note that UDP is used to handle transport at Layer 4, rather than TCP. In accordance with various embodiments, UDP may be selected for its simplicity, low overhead, and multicast support. It is well suited for low-latency networked video, but does not guarantee data delivery. To address this limitation, the GigE Vision standard includes an optional mechanism that allows video sources to resend undelivered data to video receivers. This mechanism can also be turned off if resending data is not required for the application. Typically, in a properly architected in-vehicle network, where the constant bandwidth of uncompressed video has been taken into consideration, packets will rarely if ever be dropped.

This mechanism, together with other areas of the standard, may allow performance-oriented implementations of the GigE Vision standard to guarantee video transport and achieve low and predictable latency, even during a resend.

The first two versions of the GigE Vision standard focused primarily on point-to-point connectivity between video sources and receiving software in a host PC. Version 1.2 of the standard, ratified in January 2010, includes a range of updates that meet growing demand for application architectures that make better use of Ethernet's powerful networking capabilities. Version 1.2 permits a wide range of network-connected elements (basically anything that can be managed by GVCP) to be registered as compliant products. In addition to the cameras, external frame grabbers, SDKs, and software processing and display applications covered in earlier versions of the standard, GigE Vision now supports, for example, video servers, hardware video receivers, video processing units, network-controlled devices, and management entities, as illustrated in FIG. 5.

With Version 1.2 in place, the GigE Vision standard is ideally suited for the high performance, richly featured video networks required for military vetronics systems incorporating today's advanced vision sensors. Version 2.0 of the GigE Vision standard, ratified in 2012 by the AIA's GigE Vision Technical Committee, optimises the standard for high-speed transport. The technical work has five key thrusts, as detailed in FIG. 4. Although Version 2.0 formally includes 10 GigE in the standard text, the standard does not preclude the use of 10 GigE in systems compliant with earlier versions of the standard.

Figure 6:
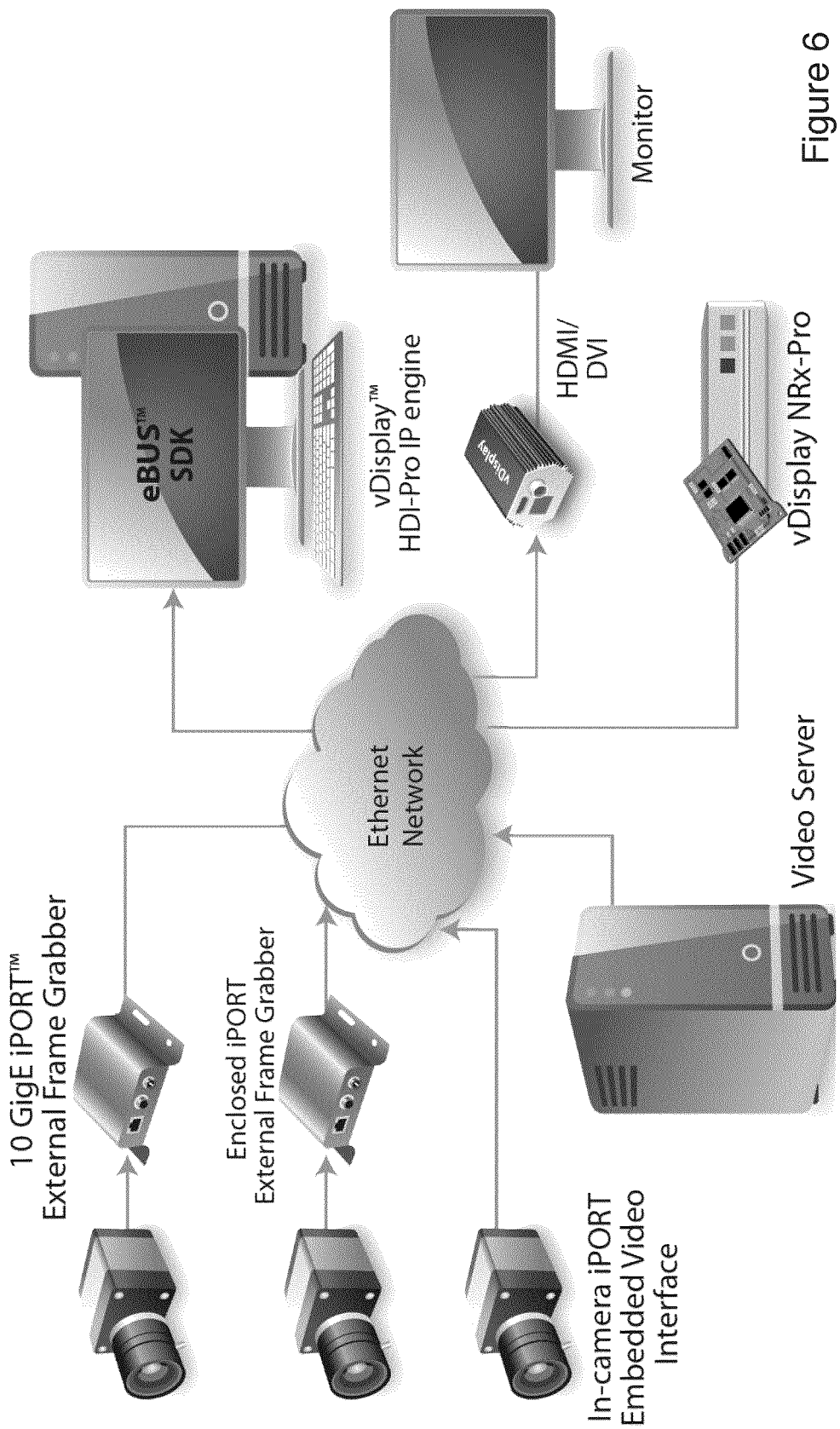
FIG. 6 is a schematic of solutions to leverage the networking flexibility of switched Ethernet architectures, in accordance with various embodiments.
Figure 7:
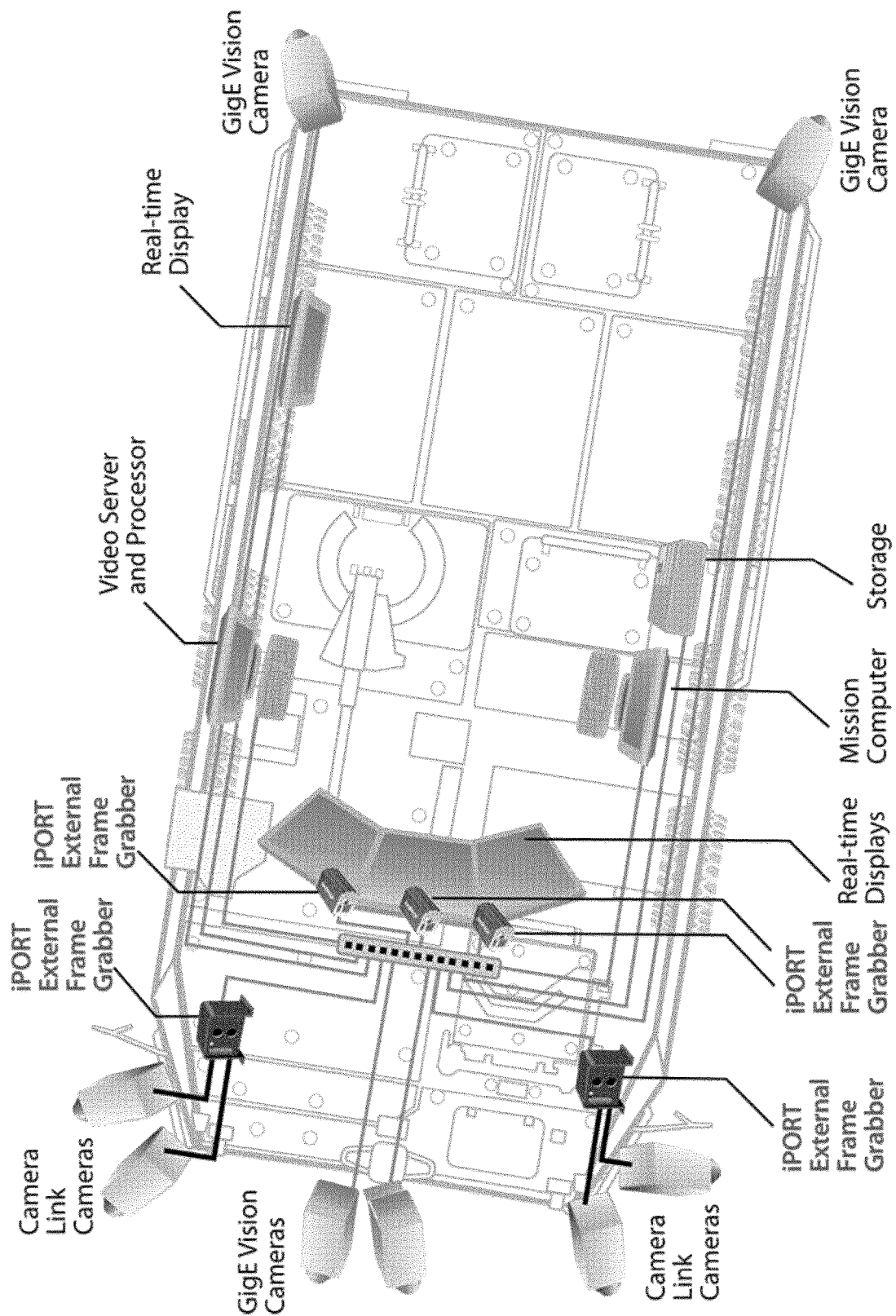
FIG. 7 is a schematic of a military vehicle retrofit scenario using networked video connectivity elements, in accordance with at least one embodiment.

The Ethernet/GigE Vision platform provides an excellent framework for building high-performance networked video connectivity systems for vetronics LSA. However, it is the quality of the implementation that defines the performance levels of video networks based on the Ethernet and GigE Vision standards. Many performance characteristics that are important to new-generation vetronics systems, such as low and consistent latency, high throughput, guaranteed data delivery, and low CPU usage, vary with the implementation method. Achieving an implementation that meets the stringent performance requirements of LSA systems for military vehicles is time-consuming, expensive, and technically challenging. In part to address this need, various embodiments relate to networked connectivity solutions for, for instance, mission-critical, real-time applications in the military, medical, and manufacturing sectors, whereby networking elements are compliant with the GigE Vision standard. Furthermore, various embodiments enable solutions to support many different network configurations, ranging from traditional point-to-point connections between a camera and mission computer to, for instance, more advanced configurations based on switched Ethernet client/server architectures, as shown in FIG. 6.

Various embodiments relate to networked video connectivity solutions compliant with the GigE Vision standard, although other vision interfacing solutions may be used in other embodiments. For instance, and in accordance with various embodiments, embedded hardware products may allow designers of cameras and other imaging devices to integrate video interfaces with core sensor electronics quickly, with minimal risk via embedded video interfaces. Additionally, or alternatively, frame grabbers may allow manufacturers to integrate a wide range of cameras into a wide range of system types with plug-and-play simplicity. Various embodiments relate to frame grabbers that are internal to PCs having a peripheral card slot, or those that are external to PCs and do not require a peripheral card slot. Further embodiments relate to the ability to incorporate tool kits such as the eBUS™ SDK to quickly and easily develop third-party or custom video applications. Such tool kits may include sample source code and executables that provide working applications for functions such as device configuration and control, image and data acquisition, and image display and diagnostics. They may further operate under Windows or Linux operating systems, include drivers for, for instance, transferring video data in real time directly to applications, and may optionally not be subject to task demands from an operating system.

Various embodiments further relate to robust, end-to-end platforms that may be compliant with the GigE Vision standard, or other vision standards, and may be tailored to meet the networked video requirements of LSA programs for both the retrofit of existing vehicles, as well as the design of new ones. For retrofit programs, communications elements such as frame grabbers may be used to convert analog and digital feeds from existing video sources into GigE Vision compliant video streams. The streams may then be incorporated into a common, real-time GigE Vision framework that may be all-digital, all-networked, and manageable. Such embodiments may salvage the use of legacy cameras and sensors, while delivering a scalable Ethernet backbone that is backward-compatible with older technology and may enable the introduction of advanced digital sensor technologies.

For embodiments comprising new vehicle platforms, Embedded Video Interfaces (EVIs) may be built directly into new-generation high-resolution cameras, making them compatible with the desired standard, such as GigE Vision, from the start. Integration may be accomplished by adding an EVI to, for instance, the back end of a camera, or by integrating a core into a camera's FPGA and a digital sensor directly onto a processing board, thus reducing component count and simplifying overall hardware design. In some embodiments, mission computers can be equipped with a toolkit such as Pleora's eBUS SDK, enabling video from a GigE Vision compliant link to stream in real-time into system memory, without the need for a frame grabber. Furthermore, an external frame grabber may be deployed to reduce computer count and optimize the use of valuable in-vehicle real-estate.

FIG. 8 is a diagram of a possible retrofit implementation, in accordance with at least one embodiment, using iPORT IP engines, vDisplay video receivers, and a processing unit with an eBUS driver from Pleora. In this non-limiting example, the vehicle is equipped with a range of analog and digital cameras, which may provide views of its entire perimeter. Video from the cameras may be streamed simultaneously over a multicast network, for example using GigE Vision Ethernet standard protocol, to the driver controlling the vehicle. Some systems may support wireless and/or wired communication for this streaming. In this case, while monitors are set up in front of the driver, image streams may also be distributed through the network to other crew members, who may view the video or use the on-board mission computer to combine images for display elsewhere in the vehicle.

With all devices connected to a common infrastructure and straightforward network switching, video may be transmitted to any combination of mission computers and displays. Troops may therefore decide which video streams they need to see, without changing cabling or software configurations, or use the on-board mission computer to combine images for use by others in the vehicle.

In other embodiments related to LSA applications, video from legacy cameras may be converted to an uncompressed Ethernet-ready video stream, for example in accordance with the GigE Vision standard, by an external frame grabber and multicast over an Ethernet network to displays and processing equipment at various points within a vehicle. By adopting the GigE Vision standard for video distribution, designers may meet video performance requirements, such as those outlined in Def Stan 00-082 (VIVOE), STANAG 4697 (PLEVID), and MISB ST 1608, to enable to design of vehicle electronics platforms that comply with STANAG 4754 (NGVA), Def Stan 23-009 (GVA), and VICTORY guidelines.

In accordance with various embodiments, video, control data, and power may be transmitted over a single cable, thereby lowering component costs, simplifying installation and maintenance, and reducing cable clutter and weight in a vehicle. All computers used for processing and mission control may further connect to the network via their standard Ethernet port, eliminating the need for a computing platform with an available peripheral card slot. Designers may thus, in accordance with various embodiments, employ ruggedised laptops, embedded PCs, or single-board computers for image analysis and control to help lower costs, improve reliability, and meet size, weight, and power (SWaP) objectives, while easily adding advanced capabilities to reduce cognitive burden and increase mission effectiveness for end-users.

In accordance with various embodiments is a network processing unit, herein interchangeably referred to as "RuggedCONNECT", or "transceiver unit", that enables a scalable, flexible approach to real-time sensor networking. Various embodiments further relate to scalable, flexible, real-time video sensor networking. Such a unit may be a highly integrated standalone device that may acquire, process, and display real-time data for, for instance, vehicle-based local situational awareness and/or driver vision enhancer (DVE) applications. It may further comprise a networked video switcher having a number of analog composite inputs (e.g. eight inputs) supporting, for instance, RS-170/NTSC/PAL and/or DVI-D displays (e.g. two independent single link displays). Units may support GigE Vision and/or Def Stan 00-082 streaming protocols via, for instance, Ethernet channels (e.g. dual 1 Gb/s ethernet channels), for networked, open standard, interoperable video management systems as demanded by, for instance, GVA, NGVA, and/or VICTORY standards.

Various embodiments may further relate to a RuggedCONNECT unit that may combine with GPU resources (e.g. NVIDIA Jetson TX2i) for application-specific image processing and graphics overlay, and/or decision-support capabilities to reduce cognitive burden and increase mission effectiveness. Furthermore, such a combination may further support applications such as image fusion, 360-degree stitching, map/terrain overlay, image enhancement, and/or more demanding processes such as convolutional-neural network-based threat detection and classification.

Such units may have a highly configurable architecture that may host, for instance, multiple mini-PCIe and/or M2 daughter cards, enabling fast development of products to address various sensor and display interfaces, such as HD-SDI, CameraLink, VGA, STANAG-3350, or custom sensor/display requirements. Such architecture, in accordance with various embodiments, may enable the addition of more interfaces, and/or support a mix of interfaces, additional network interfaces, and/or general communications ports. For embodiments related to extreme SWaP-C requirements, units may comprise a reduced number of interfaces and smaller overall enclosure size. At least one embodiment relates to a video processing unit comprising 8 video inputs (e.g. RS-170/NTSC/PAL), 2 fully independent DVI-D displays, components of RS-232/422/485, CANbus, USB2.0, and GPIO, dual ethernet capability to enable system level redundancy and effective communications capabilities, bypass channels for select inputs to provide additional redundancy during degraded operating situations, and a scalable technology platform to support multiple sensor and display configurations, including basic sensor, display, and/or network-only processing units. Various embodiments further relate to a system enabling plug-in artificial intelligence solutions for, for instance, machine learning-based tank detection or driver assistance, or having a software platform to provide features such as network-based video switching or advanced situational awareness. Moreover, units may comprise an open framework to load custom imaging plugins to perform real-time video analysis.

Furthermore, at least one embodiment relates to a processing unit that eases design of standards-compliant vetronics imaging platforms. For instance, various embodiments relate to systems that are GigE Vision- and Def Stan 00-082-compliant, are GVA-, NGVA-, and VICTORY-ready, have MIL-STD-1275E power supplies, and have MIL-STD-810G and MIL-STD-461F conformance for shock, vibration and EMI. Various embodiments may further comprise powerful GPU resources, such as those of NVIDIA Jetson TX2i configured as a system-on-module and enabling application-specific capabilities. Such resources may comprise, for instance, a 256 core Pascal GPU, a quad-core ARM Cortex-A57 CPU system, a dual-core Denver CPU system, 8 GB LPDDR4, multichannel hardware compression (e.g. H.264/H.265/JPEG), operability to encode and/or decode signals, dual independent displays, and/or OpenCV, OpenGL, CUDA, or Video4Linux.

In accordance with various embodiments, FIG. 8A shows a non-limiting example of a video processing unit 800, or RuggedCONNECT system, having a plurality and variety of ports 810 and 820 for signal input and/or output. FIG. 8B shows tabulated non-limiting exemplary components, functional specifications, customisation options, and various mechanical, environmental and power specifications of a system such as that of FIG. 8A.

In accordance with various embodiments, ports 810 or 820 of FIG. 8A may further enable similar units to connect to one another by a wired connection (e.g. units may be daisy-chained together) to, for instance, share information, data, and/or resources. Yet other embodiments relate to units wirelessly connected, such as via an internet protocol, connectionless transport protocol, UDP, UDP-lite, or the like. Such embodiments may be of use in, for instance, scaling up a network size (e.g. increasing the number of available ports in a system) without having to design and/or purchase a larger system, such as one having 15 ports that is correspondingly bulky and precludes use of a previously purchased 8-port unit. Networks comprising a plurality of units so connected may further preclude the need for an external or centralised server to communicate image, video, audio, or text data between network components. Such networks comprising connected units may further communicate via packetised data transfer in embodiments in which a processing unit comprises both transceivers for inbound/outbound data transfer (e.g. transceivers operable to receive and multicast packetised network signals) and a signal converter operable to packetise/de-packetise network signals.

In accordance with various embodiments is a network processing unit such as that of FIG. 8A that may operate as an all-in-one rugged switch for sensor capture, streaming, processing, display, and the like. Various embodiments relate to a unit that may transmit real-time, low-latency sensor data across a secure network to processors and/or displays for, for instance, advanced warning and effective mission planning in military operations. Embodiments may further comprise a crew-centred design for intuitive systems that may reduce cognitive burden, and may have configurable architecture for standards-compliant platforms (e.g. vehicle platforms compliant with NGVA, GVA, VICTORY, or the like) that may be rapidly deployable, mission-configurable, and cost-effective. Units may be employed in, for instance, SWaP-C-optimised imaging platforms with high scalability and flexibility to incorporate future capabilities with minimal integration effort, such as plug-in AI solutions for machine learning-based tank detection and identification, driver assistance (e.g. changing soil conditions, gradients, obstacles, etc.), integration of GPU resources, and the like.

Figure 9A:
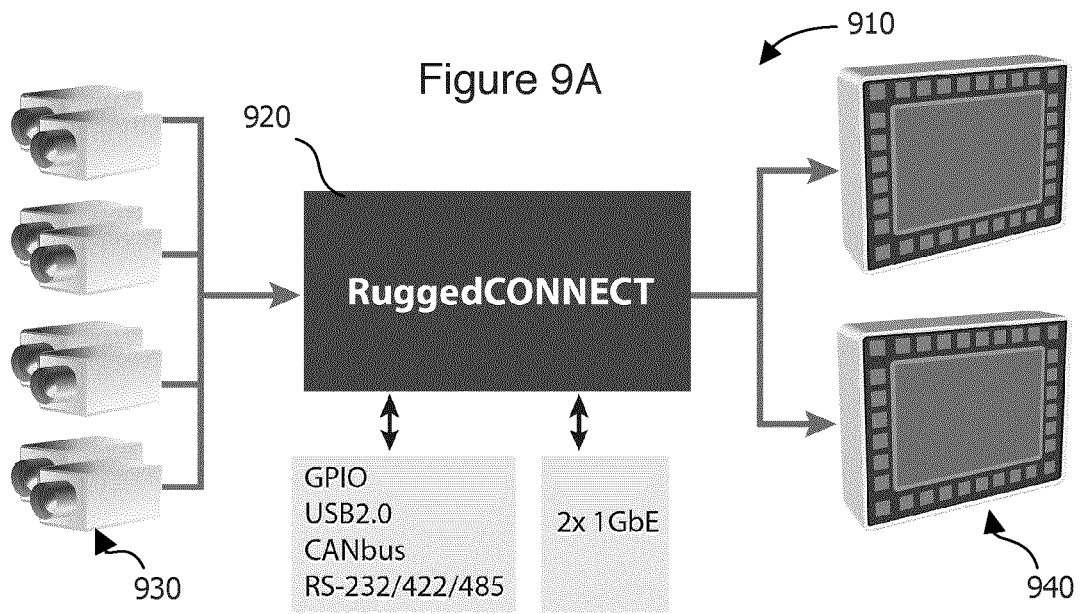
FIG. 9A is a schematic of an exemplary system of media acquisition and presentation units interfaced with a transceiver unit.

FIG. 9A shows a schematic illustrating an exemplary system 910 for providing scalable media acquisition and presentation, in accordance with various embodiments. In this non-limiting example, a transceiver unit 910 may serve as an interface between one or more media acquisition units 920 and media presentation units 930. Media acquisition units may comprise, for instance, one or more video cameras, microphones, or the like, or combination thereof, while media presentation units may comprise, for instance, one or more displays, speakers, or the like, or combination thereof. This exemplary embodiment shows an in situ camera-to-display system, but embodiments of the instant disclosure include systems where one or more (or indeed all) of the camera(s) (i.e. media acquisition device) and the presentation devices (i.e. screen or accessible data source providing information relating to the acquired media data in a digital form) are not in situ.

In accordance with various embodiments, the transceiver unit 920 may comprise a network processing unit as described above (e.g. that of FIG. 8A), and as such, may have any number of ports (e.g. 8 ports, such as elements 810 or 820 of FIG. 8A) that may be configured to provide connections for one or more of receiving and/or transmitting media signals (e.g. analog or digital source media signals). Various embodiments may relate to ports operable to accommodate one or more, or combination of, connections, such as Ethernet, general purpose input/output (GPIO), USB, controller area network (CAN) bus, RS-232/422/485, and the like.

The transceiver unit 920 may further comprise a signal converter operable to packetise media data, such as source media signals, for communication over a network (e.g. a packetised communications network). A signal converter may additionally, or alternatively, be operable to convert packetised signals to output corresponding source media signals (e.g. analog or digital source media signals), to, for instance, presentation units 940 via ports, such as those indicated by elements 810 or 820 of FIG. 8A. In some embodiments, the signal converter is configured to accept electrical signals communicating video signals and convert them into packetized video transmission for communication over Ethernet-compliant communications networks. In some cases, the transceiver unit may utilize video, image, and/or machine-vision interface standard protocols for interfacing source media signals with packetized communication networks. These may include hardware-related standards, which may include or relate to GigE Vision, CoaXPress, Camera Link HS and USB3 Vision, as well as software-related standards, for implementation on legacy computing devices, which may include GenICam, IIDC2. Embodiments hereof are not limited to a specific interface standard, nor indeed a specific class or standard of packetized network communication. In some embodiments, the transceiver unit or the signal converter thereof, is configured to accept signal input from any one or more media acquisition devices, or types or classes thereof, which may communicate any number of types of media signals, including analog, digital or electrical signals, and as well as packetized or other network communication signals. For example, in some embodiments, a transceiver may be configured to accept GigE Vision/network cameras (or other types of media acquisition devices that provide a packetized or network-enabled media signal in accordance with another interface, communication, and/or network protocol) into an input thereto or into one of the plurality of inputs thereof. Conversely, in some embodiments a given transceiver unit may be configured to provide the media signal output to any one or more media acquisition devices, or types or classes thereof, which may communicate any number of types of media signals, including analog, digital or electrical signals, and as well as packetized or other network communication signals. For example, in some embodiments, a transceiver may be configured to communicate media signals via an output thereof to GigE Vision/network displays or analysis devices (or other types of media presentation devices that provide a packetized or network-enabled media signal in accordance with another interface, communication, and/or network protocol) into an input thereto or into one of the plurality of inputs thereof.

The transceiver unit 920 may further comprise a media data transceiver, or a packetised network media data transceiver, operable to send and/or receive media signals (e.g. packetised network media signals, such as those packetised by a signal converter in the same device 910, or in another network device) over, for instance, a packetised communications network.

A transceiver unit 920 may be operable to interface acquisition 930 and presentation 940 units in a system 910 through wired connections. While optionally operable to packetise source media signals over a network, a unit 920 may be configured in a system 910 to transfer analog and/or digital source media signals (e.g. audio data, image/video data, text data, etc.) from an acquisition unit 930 to a presentation unit 940 directly without signal conversion. Various embodiments may further relate to a transceiver unit 920 having a port (e.g. elements 810 or 820 of FIG. 8A) enabling bidirectional communication (i.e. one or more ports may be operable to both send and receive signals, for instance to communicate via an Ethernet connection).

The scalability of such a platform, in accordance with various embodiments, is highlighted in the schematic of FIG. 8B. In this example, the system 910 of Figure A is operable coupled with a similar system 912 via a network 900 of the transceiver unit 920 and a second transceiver unit 922 having similar properties to that of the first transceiver unit 920 (e.g. a signal converter operable to packetise and/or convert source media signals and packetised network signals, a transceiver operable to send and/or receive packetised signals). While this example shows a packetised communications network 900 size of two transceiver units 920 and 922, various embodiments relate to highly scalable networks wherein any number of units may be added to the system.

For instance, additional transceiver units may be added to such packetised communications networks by announcing their presence to the network 900. For example, a transceiver unit such as that of element 920 may have a unique address (e.g a MAC address). Additional units, such as that of element 922, may announce themselves to the network 900 with a corresponding unique address, and may then be incorporated within the network 900. Such networks, while optionally employing wired connections, may additionally, or alternatively, comprise a means known in the art for conveying signals, or packetised network media signals, such as an internet protocol, and/or a connectionless transport protocol such as UDP, UDP-lite, or the like. As such, embodiments may relate to systems comprising transceiver units that may unidirectionally or bidirectionally communicate packetised network media signals with each other over the network 900, and may further conform to communication that is compliant with, for instance, a GigE Vision standard, and/or a GigE Vision interface standard. In such a way, the number of inputs and outputs in the system can scale limitlessly; if additional ports are required, a new transceiver unit that is accepted on to the network of the existing transceiver unit(s) can be added at any time in connection with any type of media component (i.e. whether or not directly connective or compatible with an existing installed base of media components). In addition, the local network made up of the transceiver units do not access a centralized server, system, or network, but rather communicate amongst themselves directly; accordingly, the network of transceiver units can be scaled at any time and need not have access to an external network.

In accordance with various embodiments, a second transceiver unit 922 may be a component of a respective system 912 having respective a media acquisition unit(s) 932, and/or may be connected to a respective presentation unit(s) 942. For instance, the system 912 may comprise media acquisition units that differ in number or type (e.g. audio/visual), or combination thereof, from those of system 910. Various embodiments may further relate sharing of source media data between various components of the network 900 via, for instance, communication between transceiver units 920 and 922. For example, source media data acquired by an acquisition unit 930 of system 910 may be received at a port of the transceiver unit 920 as a source media signal. The source media signal may then be packetised and sent over the network 900 as a packetised network media signal via, respectively, a signal converter and a packetised network media data transceiver associated with the unit 920. The packetised network media signal may then be received by a packetised network media data transceiver associated with another unit 922 of the network, which may convert the packetised network media signal to a source media signal using a signal converter associated therewith, and transmit the source media signal to a presentation unit 942 of the system 912. Similarly, media data acquired via acquisition units 932 may be received as source media signals by transceiver unit 922, packetised and transmitted to unit 920 over the network 900, converted to a source media data signal and then presented via a presentation unit 930.

Figure 9B:
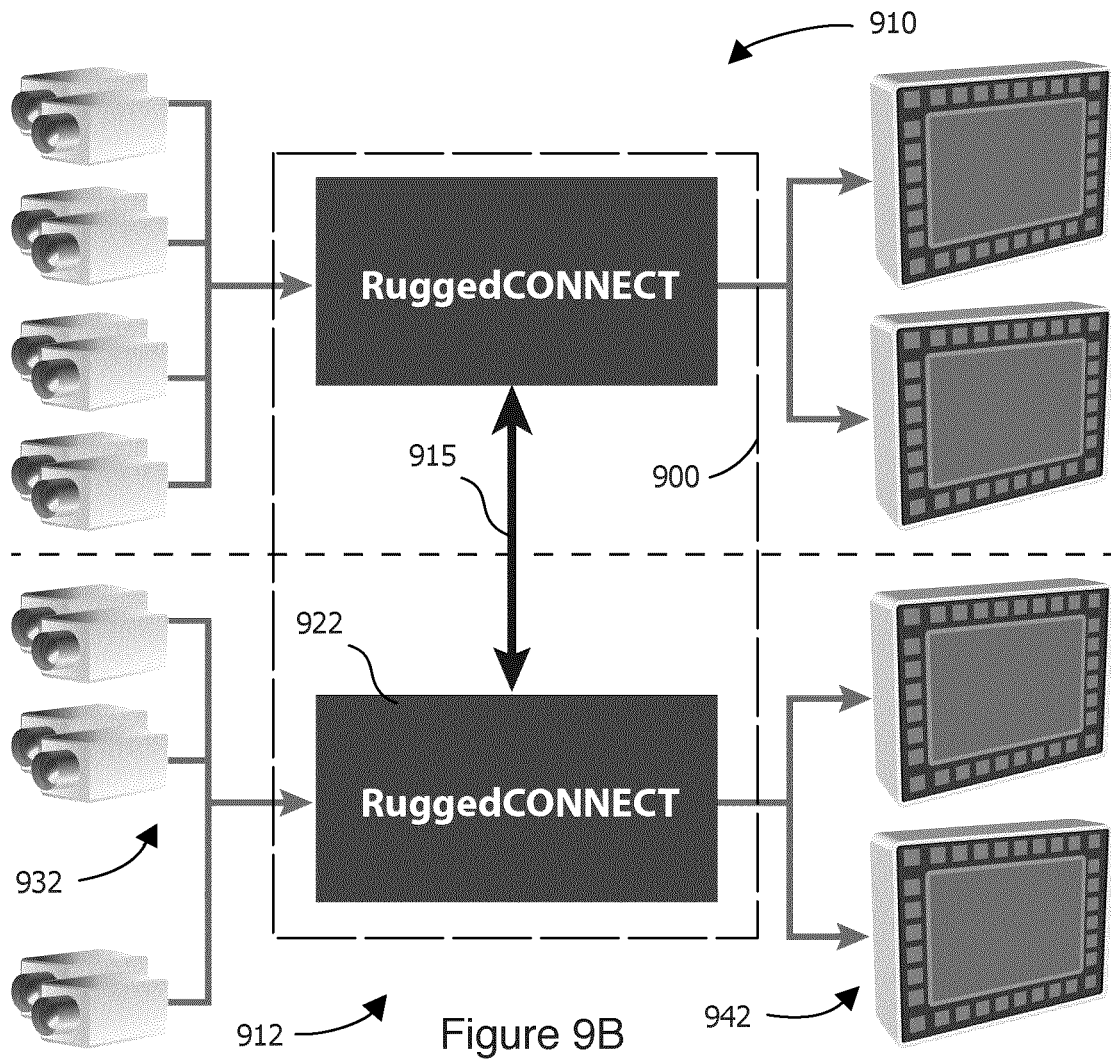
FIG. 9B is a schematic of a network comprising a plurality of systems such as that of FIG. 9A, in accordance with various embodiments.

Furthermore, various embodiments may relate to systems wherein one or more transceiver units 920 and/or 922, or additional units in the system, are not operably coupled to one or more of media acquisition units and presentation units. For instance, if each transceiver unit of a system comprises 8 ports, such as those of elements 810 and 820 of FIG. 8A, and an application required 12 input video streams (e.g. to obtain a 360-degree view surrounding a tank) to be output to a single presentation unit (e.g. a display screen with 12 views), a system comprising two transceiver units, for example units 920 and 922 in FIG. 9B, may be employed. In order to accommodate the necessary system components, and in accordance with at least one embodiment, each transceiver unit 920 and 922 may, for instance, each be operably coupled with 6 media acquisition units 930 932, respectively. A port on, for instance, unit 920 may then be employed to output 12 video streams to a single display unit 940, while unit 922 may not output a source media signal. Similarly, if many presentation units are required to receive an audio stream (e.g. audio to many different personnel of a tank, each with respective headsets), output may be shared between ports on both transceiver units 920 and 922, while only, for instance, unit 922 receives as input a source audio signal. Accordingly, any limitation, in situ or otherwise, with respect to the number of physical input ports available for installing additional media acquisition devices, is addressed by adding another transceiver unit, which may have one or more input ports. Conversely, a limitation with respect to the number of outputs, in situ or otherwise, available for connecting a media presentation device, is addressed by adding another transceiver unit. In some embodiments, the input of any of the transceiver devices is available from the output of any transceiver unit (including the same or one of the other transceiver devices).

While various embodiments, as well as conventional media communications networks, may comprise a central server and/or network server(s), embodiments may further relate to networks that comprise exclusively transceiver units such as those of elements 920 and 922 of systems 910 and 912 (i.e. a network 900 may optionally not comprise a centralised server system). Similarly, network components, such as transceiver units 920 and 922, may be situated locally, i.e. in situ, such as on a vehicle (e.g. a tank, armored car, etc.), and may thus comprise a local area network (LAN). Additionally, various embodiments may relate to a network 900 wherein all network components, including media acquisition 930 and 932 and presentation 940 and 942 units may be similarly comprising a network in situ. In other embodiments, the network components may be remotely located.

Thus, various embodiments relate to systems that relate to a modular, scalable, and open networking platform that comprises highly scalable architecture for a wide range of applications. For instance, systems may comprise camera-to-display systems (e.g. a system 910 comprises a camera 930 which acquires source media data which may be transferred to a display 940 as a source media signal via the transceiver unit 920 coupled to components using wire-based connections), or may comprise complex, fully networked applications integrating different sensors and display types, switching, processing, and recording units. Such systems may be employed for, for instance, local situational awareness (LSA), driver vision enhancer (DVE) applications, or the like, or may complementarily be applied as, for instance, an all-in-one solution to route video sources to a display or processing unit without going through a network.

For situations with extreme SWaP-C requirements, and in accordance with various embodiments, interfaces can be scaled down from, for instance, that presented in FIG. 8A, and system components may be adapted to scale down devices. For instance, custom sensor adapters may acquire sensor streams, apply processing, and send signals to a network. A display adaptor may acquire streams from a network, apply processing, and send signals to a display. Alternatively, or additionally, image processors may acquire streams from a network, apply processing, and send processed signals back to a network.

Furthermore, various embodiments may be applied in GVA and/or NGVA networking applications. For instance, for new vehicle architectures, a transceiver unit, or Rugged-CONNECT, may be coupled with a smart video switcher, as shown in FIG. 10A, as a drop-in solution that provides the benefits of sensor networking that meets video performance requirements outlined in, for instance, Def Stan 00-082 (VIVOE) and/or GigE Vision (GEV). As such, manufacturers may design vehicle electronics platforms that comply with STANAG 4754 (NGVA), Def Stan 23-009 (GVA), and/or VICTORY guidelines. In the non-limiting example of FIG. 10A, a video switcher 1000 may comprise a designated number of one or more types of media ports 1010, 1020, and 1030 (e.g. RS-170, NTSC, PAL, HD-SDI, CAN bus, USB, Ethernet, etc.), which may be operable to receive as input and/or output media signals (e.g. video, audio, text, etc.). In some embodiments, media signals may be output to individual displays, and various functionalities may offer system-level redundancy. For instance, ethernet capability may be dual to enable redundancy and more effective communications capabilities, or various inputs may comprise bypass channels for additional redundancy during, for instance, degraded operating situations.

Various embodiments may further relate to systems comprising, for instance, transceiver units and switches, such as that of FIG. 10A. FIG. 10B shows one such exemplary embodiment, wherein the system 910 of FIG. 9A is integrated with a video switcher 1000 of FIG. 10A. In this non-limiting example, the switch 1000 may be operably coupled, for instance via a GigE connection and/or over a packetised communications network, to the transceiver unit 920, the latter having any number of media acquisition units 930 and media presentation units 940 coupled thereto. The switch may further be coupled to a designated number of additional media acquisition units 1030 and additional presentation units 1040, for instance via GigE Vision (GEV) or VIVEO standards-compliant connections.

In embodiments, an acquisition unit may include any device configured to collect external data. While many of the embodiments referred to above relate to cameras or visible and non-visible light sensors, any sensors may be used to acquire external data for communication over a network. In some embodiments, acquisition units and presentation units may comprise machine-vision components, as well as non-vision-related components. While machine-vision generally refers to imaging-based automatic inspection and analysis for such applications as automatic inspection, process control, and robot guidance, usually in industry, non-vision-related sensors or acquisition units are used in some embodiments. For example, any device configured to detect changes in the environment (including but not limited to temperature, proximity, pressure, chemical, biochemical, monitoring sensors, among others) may be used for an acquisition unit. This is in addition to cameras (for visible and non-visible light), light sensors (for visible and non-visible light), frame grabbers, and other image and image data collection devices. With respect to presentation units, this may refer to a visual image or video display, but it may also refer to an automatic or computer analyser of images or video (or other sensor output). In addition, presentation unit may refer to a communication endpoint device that communicates the output media signal onto another network or to another presentation unit located elsewhere (wherein such other presentation unit may be on another network or otherwise).

In some embodiments, the media components may require a wired connection into a transceiver unit. In other embodiments, however, source media ports on transceiver units may support wireless connections, e.g. Bluetooth. In other cases, the media component may already be communicated in a packetized network signal (e.g. the acquisition unit may output GigE Vision compliant media signals), in which case the interfacing activities may be minimal, redundant, or not required.

In some embodiments, the transceiver units may comprise, or may comprise access to, media signal processing units that carry out additional functionality that could not otherwise be carried out other than by significant post-processing on custom-programmed computing devices. For example, a given media acquisition unit and a given media presentation device may not be physically or datalink compatible; accordingly, a transceiver unit that has the appropriate port for a given, but previously incompatible connection, can be added, thereby rendering the incompatible media component compatible with the other previously installed media components. Other examples may include overlaying or combining of media data from different media acquisition units and different types of medial acquisition units. Another example may include modification of media data to enhance or reduce the relative importance of certain information; this could include automated recognition of certain features or characteristics important in a machine vision context, or distinguish between natural material and camouflage material or recently disturbed ground cover from non-disturbed ground cover (the latter two examples being useful in association with military vehicles). Upon such recognition or distinguishment, the media signal itself could be modified so that a subsequent—or legacy media component, would display or otherwise recognize or distinguish the same feature or characteristic.

Figure 11:
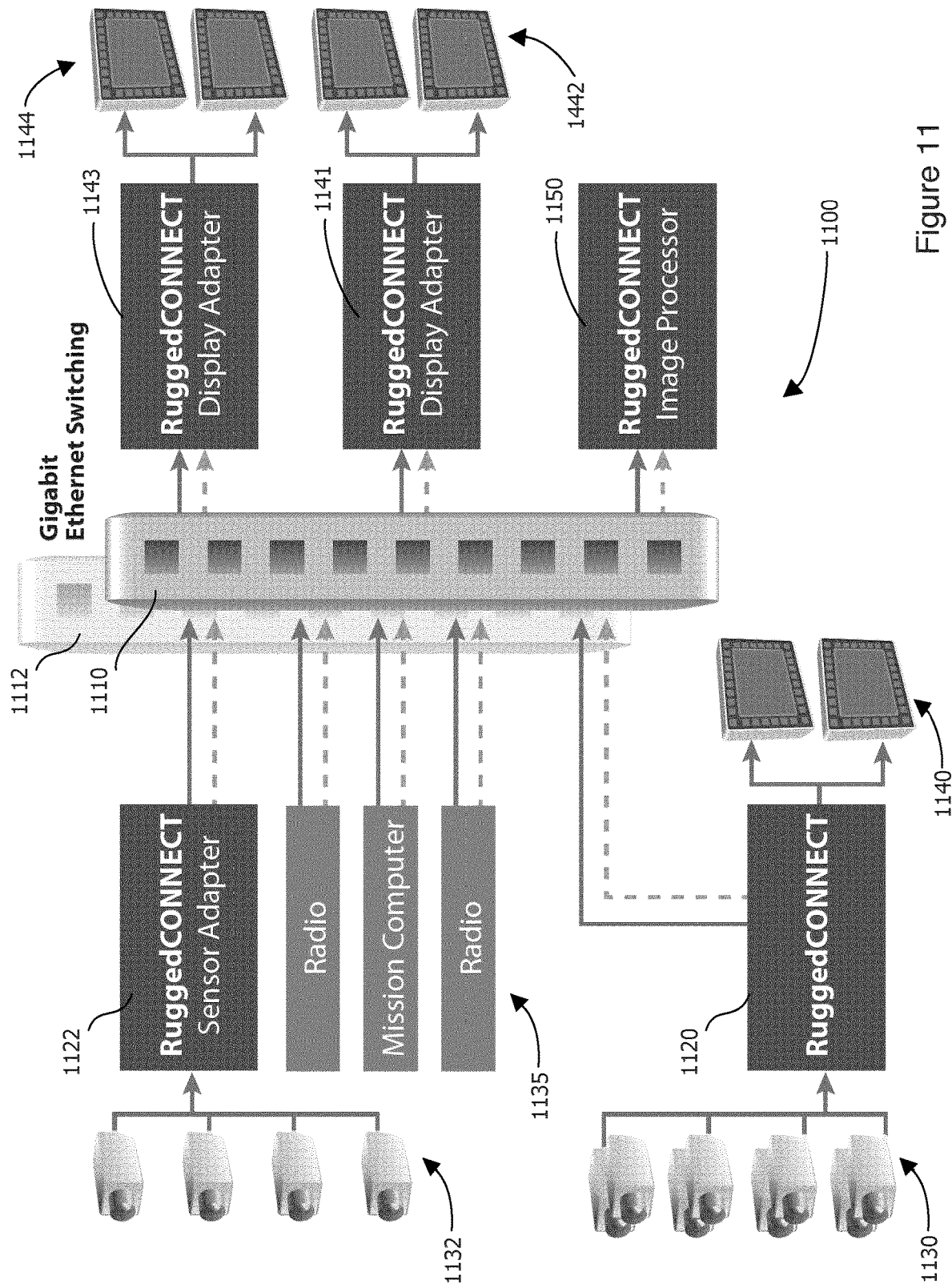
FIG. 11 is a schematic of a fully integrated network comprising, inter alia, media acquisition and presentation units interfaced with a network switch and transceiver unit, in accordance with various embodiments.

Embodiments comprising a video switch may provide a simple and easy way to integrate cameras and/or sensors in a real-time network. For instance, various embodiments further relate to fully networked systems, such as fully networked vetronics system designs with scalable, modular platforms comprising RuggedCONNECT system and switcher architectures integrating different sensor and display types with (dual) ethernet capabilities and in-built system redundancy. For instance, FIG. 11 shows an exemplary, non-limiting embodiment of such a system 1100. In this example, media acquisition 1130 and presentation 1140 systems may be interfaced with a transceiver unit, or RuggedCONNECT system 1120, which may in turn be operable coupled, such as via a GigE Vision standard connection, to a switch 1110. The switch 1110 may further be coupled with a second transceiver unit 1122 having respective media acquisition units 1132, as well as having additional sources of input 1135 of, for instance, a plurality of radio inputs and a mission computer. For additional scalability, the switch 1110 may be further connected, for instance via Ethernet protocols, or via a packetised communications network, to an additional switch 1112 having respective inputs/outputs. The switch 1110 in this example may have a variety of outputs. For instance, as discussed above, processors, such as an image processor 1150 may be operable to process media data for a variety of purposes (e.g. terrain analysis, driver assistance, etc.), which may be optionally returned to the switch 1110 for relay to external devices. Similarly, adapters, such as display adapters 1141 and 1143 may interface the switch 1110 with respective media presentation units 1142 and 1144. The skilled artisan will appreciate that in addition to various embodiments comprising one or more subsets of the system components of FIG. 11, various embodiments of a system 1100 with such scalability may further comprise additional components for increased functionality, number of users, inputs, outputs, and the like, while remaining within the scope of the disclosure.

In some embodiments, communication between transceiver units may be in accordance with a multicast protocol. In some embodiments, the multicast protocol provides for simultaneous transmission (wirelessly, via wired connection, or both) to a plurality or all of the other transceivers. Multicast addressing can be used in the link layer (layer 2 in the OSI model), such as Ethernet multicast, and at the internet layer (layer 3 for OSI) for Internet Protocol Version 4 (IPv4) or Version 6 (IPv6) multicast. For example, a multicast address may be used, which is a logical identifier for a group, or all, of the transceivers in the network of transceivers, that are available to packets, which includes process datagrams or frames, intended to be multicast for a designated network service. In other embodiments, communication therebetween may be unicasted to all or a specific subset of the other active transceivers. Other alternatives to multicast and unicast are also available in some embodiments; for example, broadcast (transmission to all available network nodes); anycast (where a particular transceiver or group of transceivers is identified or targeted as the destination for a given communication from a given transceiver or transceiver's input); or geocast (in which transceivers communicate to other transceivers that are within a particular geographic location). In such embodiments, some of all of the transceivers in a group of transceivers may be programmed or configured to communicate packetized network signals to any one, some, or all transceivers based on the communication protocol or characteristics of, for example, the source media signal, the input type or input transceiver for the incoming media source signal, the desired presentation devices that may be associated with a given input types or input port type, or other characteristics.

In accordance with another embodiment, there is also provided a scalable media distribution system operable to interface with a plurality of media data components, the system comprising two or more transceiver units that are operable to transfer packetized network media signals over said packetized communications network in accordance with one or more of a variety of routing schemes, and are operable to receive packetized network media signals transferred over said packetized communications network in accordance with one or more of a variety of said routing schemes. The routing schemes may be selected from any one of the following: unicast, multicast, broadcast, anycast, and geocast. In some embodiments, transceiver units can be configured to selectively transfer or receive packetized network media signals to a subset of other transceiver units, wherein the selectivity of the subset of transceivers is based on characteristics relating to one or more of the following: the media data components, the source media signal, one or more of said source media signal ports, the source media data, the source media signals, and the transceiver unit. In some embodiments, the devices and methods disclosed elsewhere herein may also, as an alternative (in the same or different embodiments) use different routing schemes and/or selective transmission and/or receiving of packetized network media signals. The routing schemes may, in various embodiments, including wired or wireless communication.

Figure 12:
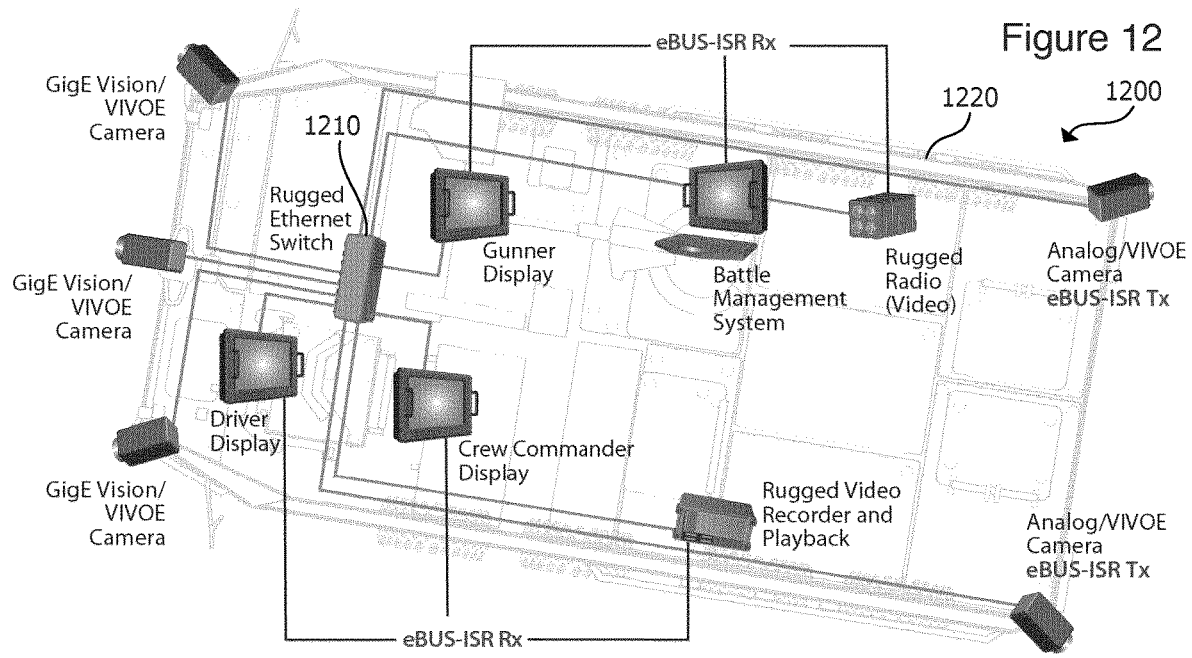
FIG. 12 is a schematic of a military vehicle housing a media communications system networked via a flexible communications interface, in accordance with various embodiments.

Further embodiments may relate to defense applications. For instance, the system 1200 of FIG. 12 shows an exemplary combination of devices that may be employed in a military vehicle 1220. In this example, the system 1200 may employ, for instance, an eBUS-ISR network for ruggedised GigE Vision with VIVOE cameras, sensors, and video equipment. In accordance with various embodiments, such equipment may be provided from multiple vendors, and yet employed within the same system 1200 due to the flexibility of a rugged ethernet switch 1210, in accordance with at least one embodiment. In at least one exemplary embodiment, a comprehensive API may enable both Linux, Windows, or other operating systems, while allowing for various processing applications via an eBUS-ISR, removing the limitation of users being tied to manufacturer-specific SDKs and further enabling development of systems using, for instance, any GigE Vision and/or VIVEO-compliant sensors. Furthermore, by enabling a shared SDK for all transport functions, designers may preserve existing software investments, in accordance with various embodiments.

Figure 13:
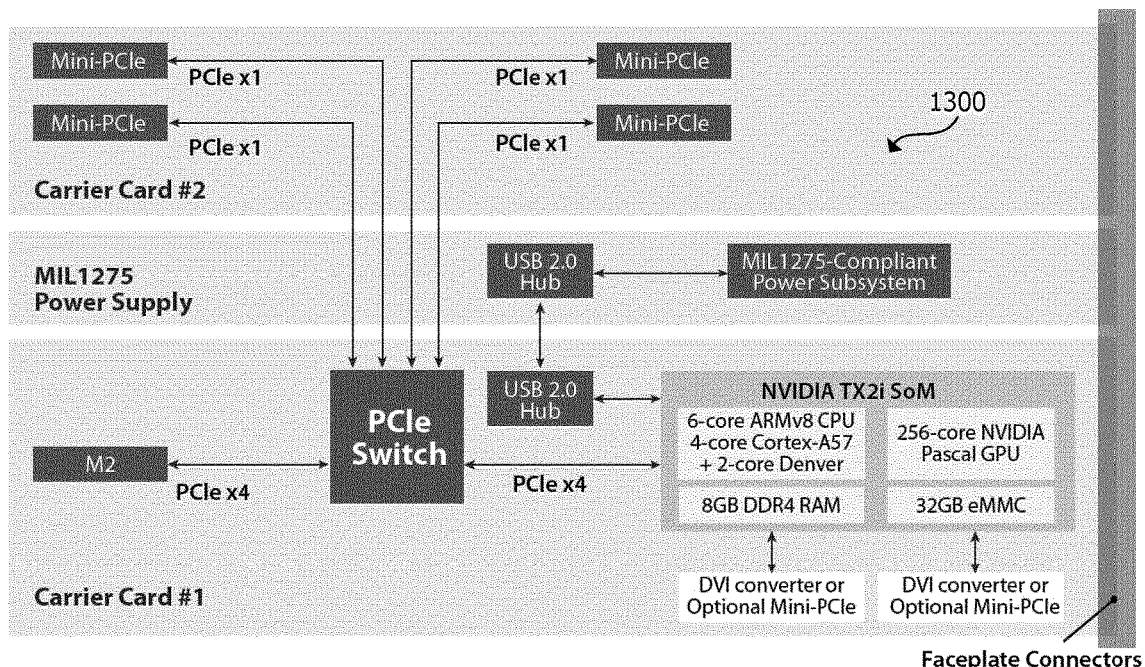
FIG. 13 is a schematic of a communications network showing an exemplary connectivity between components, in accordance with various embodiments.

As yet another example of the scalability and powerful processing inherent in various embodiments, FIG. 13 shows a potential network 1300 that highlights the configurability of a RuggedCONNECT's architecture that enables hosting of multiple mini-PCIe and M2 daughter cards to address a scalable range of sensor and display interfaces to meet a variety of application demands, such as those with SWaP-C concerns. Furthermore, such a network 1300 enables ready implementation of future capabilities (e.g. the integration of additional devices) to, for instance, increase mission effectiveness with minimum integration effort. For instance, the high-performance networking capabilities of a RuggedCONNECT system, in accordance with various embodiments, may allow for combination with powerful GPU resources of, for instance, a NVIDIA Jetson TX2i for application-specific processing and graphics overlay for decision-support and/or to reduce cognitive burden and increase mission effectiveness.

Various further embodiments relate to a scalable method of acquiring and presenting media using any of the above-mentioned embodiments of a communications system or network.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A scalable media distribution system interfacing with a plurality of media data components via network communication, said media data components comprising at least one media acquisition unit that acquires source media data and outputs corresponding source media signals, and at least one media presentation unit that receives source media signals and processes corresponding source media data, the system comprising:
    two or more transceiver units, each transceiver unit comprising:
        at least two source media signal ports, said media signal ports configured to provide a wired or wireless connection to the media data components, at least one of said media signal ports for receiving the source media signals from the media acquisition units and at least one of said media signal ports for transmitting the source media signals to at least one of the media presentation units;
        a signal converter that packetizes the source media signals received via said source media signal ports thereon from at least one of the media acquisition units for communication over said packetized communications network, and that converts packetized network media signals to the source media signals for communicating to at least one of the media presentation units via one of said source media signal ports; and
        a packetized network media data transceiver operable to wirelessly send and receiving the packetized network media signals over the packetized communications network;
    wherein each of said transceiver units multicast the packetized network media signals over said packetized communications network to all other transceiver units, and each of the transceiver units can receive from any of the other transceiver units the packetized network media signals multicasted over said packetized communications network by any other transceiver unit.

2. The system of claim 1, wherein said packetized communications network comprises said transceiver units and wherein each of said transceiver units comprises a unique device address.

3. The system of claim 1, wherein the system comprises an additional one or more of said transceiver units upon said additional one or more transceiver units announcing a presence thereof via said packetized communications network.

4. The system of claim 1, wherein the source media signals received via one of the source media signal ports are transmitted directly to another source media signal port and are not converted into a packetized network media signal.

5. The system of claim 1, wherein said packetized network media signals are communicated in accordance with a connectionless transport protocol.

6. The system of claim 1, wherein said packetized network media signals are communicated in accordance with a GigE Vision interface standard.

7. A transceiver unit device for providing scalable media distribution, the transceiver unit device configured to interface a plurality of media data components, said media data components comprising at least one at least one media acquisition unit for acquiring source media data and providing to said transceiver unit device source media signals corresponding to said source media data, and the media data components comprising at least one media presentation unit that receives the source media signals from said transceiver unit device and processes the corresponding source media data, the transceiver unit device comprising:
    at least two source media signal ports, said source media signal ports configured to provide a wired or wireless connection to the media data components, at least one of said media signal ports for receiving the source media signals from one of the media acquisition units and at least one of said media signal ports for transmitting the source media signals to one of the media presentation units;
    a packetized network media data transceiver that wirelessly multicasts packetized network media signals over a packetized communications network to other additional transceiver unit devices and that further wirelessly receives from any of the other additional transceiver unit devices the packetized network media signals that are multicasted over said packetized communications network by any of the other additional transceiver unit devices; and a signal converter for packetizing the source media signals received via said source media signal ports from one of the at least one media acquisition units for communication over said packetized communications network, and converting the packetized network media signals to the source media signals for communicating to one of the at least one of the media presentation units via said source media signal ports.

8. The device of claim 7, wherein the device multicasts the packetized network media signals to, and receives the packetized network media signals from, one or more additional transceiver units upon said one or more additional transceiver units announcing a presence thereof on said packetized communications network.

9. The device of claim 7, wherein said packetized communications network comprises said transceiver unit device and one or more additional transceiver units, and wherein all of the transceiver unit device and said one or more additional transceiver units each comprise a unique device address.

10. The device of claim 7, wherein the source media signals received via one of the source media signal ports are transmitted directly to another source media signal port and are not converted into a packetized network media signal.

11. The device of claim 7, wherein said packetized network media signals are communicated in accordance with a connectionless transport protocol.

12. The device of claim 7, wherein said packetized network media signals are communicated in accordance with a GigE Vision interface standard.

13. A scalable media distribution method for interfacing a plurality of media data components, said media data components comprising at least one media acquisition unit that acquires source media data and outputs corresponding source media signals, and at least one media presentation unit that receives the source media signals and processes as output the source media data, the method comprising:

receiving as input at one of a plurality of source media signal ports disposed on a first transceiver unit the source media signal, at least some of said source media signal ports configured to provide a wired or wireless connection between the at least one media acquisition unit and said first transceiver unit for the receiving source media signals;

converting the source media signal received by the first transceiver unit to packetized network media signals;

multicasting said packetized network media signals over a packetized communications network to one or more other additional transceiver units;

receiving from any other additional transceiver units the packetized network media signals multicasted by said any other additional transceiver units;

converting packetized network media signals received from said any other additional transceiver units to the source media signal; and outputting via one of the source media signal ports the source media signal, said output source media port configured to provide a wired or wireless connection to at least of the one media presentation units for processing thereby.

14. The method of claim 13, wherein said first transceiver unit receives said packetized network media signals from one or more other additional transceiver units upon said one or more other additional transceiver units announcing a presence thereof via said packetized communications network.

15. The method of claim 13, wherein said packetized communications network comprises said first transceiver unit and said one or more other additional transceiver units, and wherein all of the first transceiver unit and said one or more other additional transceiver units each comprise a unique device address.

16. The method of claim 13, wherein said source media signals received via one of the source media signal ports on the first transceiver unit are transmitted directly to another source media signal port on the first transceiver unit and are not converted into the packetized network media signals.

17. The method of claim 13, wherein said multicasting comprises transmitting said packetized network media signals in accordance with a connectionless transport protocol.

18. The method of claim 13, wherein said communicating comprises transmitting said packetized network media signals in accordance with a connectionless transport protocol in accordance with a GigE Vision interface standard.

19. A scalable media distribution method for interfacing a plurality of media data components, said media data components comprising at least one media acquisition unit that acquires source media data and outputs corresponding source media signals, and the media data components comprising at least one media presentation unit that receives the source media signals and outputs corresponding source media data, the method comprising:

receiving as input at one of a plurality of source media signal ports disposed on a first transceiver unit the source media signal, at least some of said source media signal ports configured to provide a wired or wireless connection between the at least one media acquisition unit and said first transceiver unit for receiving the source media signals;

converting the source media signal received by the first transceiver unit to packetized network media signals;

communicating said packetized network media signals in accordance with a routing scheme to one or more additional transceiver units;

receiving from any other additional transceiver units the packetized network media signals communicated by said any other additional transceiver units in accordance with said routing scheme;

converting the packetized network media signals to the source media signal; and outputting via one of the source media signal ports the source media signal, said output source media port configured to provide a connection to at least one of the one media presentation units for output thereby of source media data.

20. The method of claim 19, wherein said routing scheme may selected from any one of the following: unicast, multicast, broadcast, anycast, and geocast.

21. The method of claim 19, wherein said transceiver units are configured to selectively transfer the packetized network media signals to a subset of other transceiver units.

22. The method of claim 19, the method further comprising:

determining the subset of other transceiver units sharing one or more characteristics relating to one or more of the following: the media data components, the source media signal, one or more of said source media signal ports, the source media data, the source media signals, and the first and/or other additional transceiver units.

23. The system of claim 1, wherein control data for controlling one or more media presentation devices and/or media acquisition devices are multicasted by the transceiver units over the packetized communications network.

24. The device of claim 7, wherein the transceiver unit device multicasts control data for controlling one or more media presentation devices and/or media acquisition devices.

25. The method of claim 13, wherein said packetized network media signals comprise control data for controlling one or more media presentation devices and/or media acquisition devices.

26. The method of claim 19, wherein said packetized network media signals comprise control data for controlling one or more media presentation devices and/or media acquisition devices.

* * * * *